Oct. 16, 1951   E. P. SAUNDERS   2,571,621
SPEED CHUCK
Filed March 26, 1947
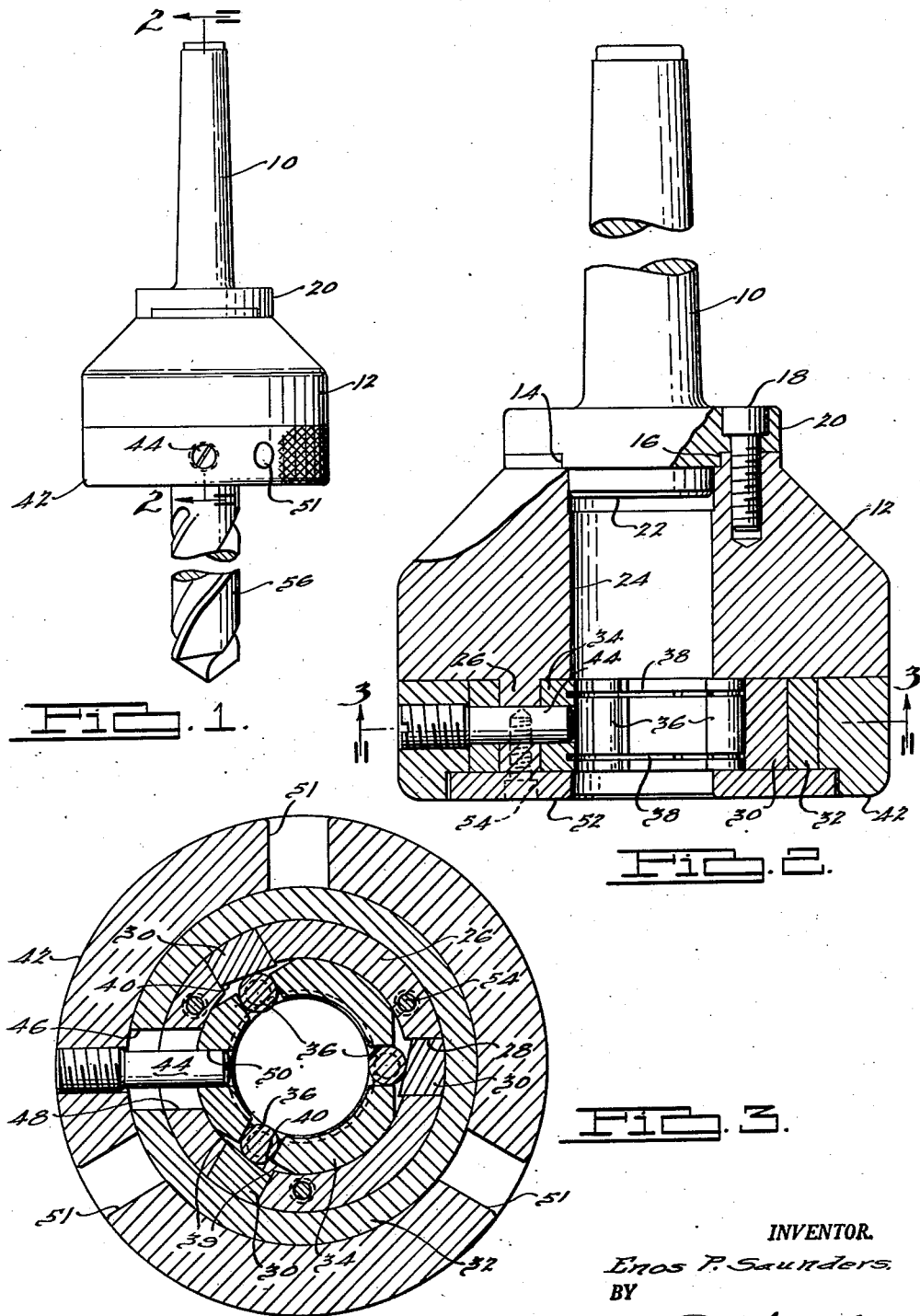
INVENTOR.
Enos P. Saunders,
BY
Harness, Dickey & Pierce.
ATTORNEYS.

Patented Oct. 16, 1951

2,571,621

UNITED STATES PATENT OFFICE 2,571,621

SPEED CHUCK

Enos P. Saunders, Berkley, Mich.

Application March 26, 1947, Serial No. 737,261

3 Claims. (Cl. 279—72)

The present invention relates to machine tool equipment and more particularly to an improved speed chuck adapted for use in lathes, drill presses and the like.

The present invention contemplates the provision of an improved speed chuck of the type having arcuately spaced elements adapted to engage a member to be chucked, such as stock or other work or the shank of a tool or the like and in which these elements are movable along cooperating cam surfaces to effect a chucking of the member.

Another object of this invention is to provide an improved speed chuck of the above mentioned type in which the cam surfaces thereof are provided on angularly spaced cam blocks mounted in slots formed in the body thereof and held against movement radially outward by a member surrounding the body.

A further object of the invention is to provide an improved speed chuck for releasably holding a member to be chucked, the member engaging elements of which are carried between spacer means operable by an operating ring which surrounds the body and is connected to the spacer means by a pin projecting radially through a slot in the body.

With the above as well as other and in certain cases more detailed objects in view, a preferred but illustrative embodiment of the invention is illustrated in the accompanying drawing throughout the several views of which corresponding reference characters designate corresponding parts, and wherein:

Figure 1 is a broken view in elevation of a speed chuck embodying the invention;

Fig. 2 is an enlarged sectional view of the structure illustrated in Fig. 1, taken substantially along the line 2—2 thereof; and Fig. 3 is a sectional view of the structure illustrated in Fig. 2, taken along the line 3—3 thereof.

It will be appreciated from a complete understanding of the invention that in a generic sense the improvements thereof may be embodied in machine tool or work holding devices of widely differing types and sizes. It will be apparent to those skilled in the art that the chuck of the present invention is well adapted for use in lathes and particularly speed lathes. It will also be appreciated that the chuck of the invention may be employed to hold stock or other workpieces as well as the shanks of many types of tools. In an illustrative, but not in a limiting sense, the present improvements are herein disclosed as embodied in a speed chuck adapted for use in a conventional drill press or the like for rigidly holding a drill, reamer or the like.

Referring to the drawing, the speed chuck comprises a shank 10 having a cylindrical body member 12 rigidly fixed thereto for rotation therewith. In the broader aspects of the invention, it will be appreciated that the body 12 may be secured to the shank 10 in any suitable manner, but in the preferred embodiment illustrated, a driving engagement between the shank 10 and the body 12 is provided by the reception of a transversely extending tongue or projection 14 integrally formed on the shank 10 in a complementary slot 16 extending transversely of the body 12 and the body is secured against movement axially of the shank 10 by means of a plurality of bolts 18 extending through an outwardly extending flange 20 integrally formed on the shank 10 and threaded into the body 12. Proper alignment of the body 12 with the shank 10 is effected by means of a centrally disposed, axially extending cylindrical projection 22 integrally formed on the shank 10 which is received in a closely fitting cylindrical bore 24 formed centrally of the body member 12 and extending axially thereof.

At the end thereof remote from the shank 10, the body 12 is provided with a concentric annular axial extension 26 which is provided with three radially disposed and equally angularly spaced slots 28, each of which receives a closely fitting cam block 30. A wear ring 32 surrounds the body extension 26, and in the broader aspects of the invention may be secured against rotation relative to the body extension 26 in any suitable manner, but in the preferred embodiment illustrated, it is shrunk onto the extension. The wear ring 32 engages the outer ends of the cam blocks 30 to prevent outward radial movement thereof during the stress of a chucking operation.

Within the annular body extension 26 are three like ring segments 34, between the adjacent ends of which are hard cylindrical rollers 36 extending longitudinally of the body extension 26. The rollers 36 and the radially inwardly presenting faces of the ring segments 34 are grooved to receive snap rings 38 which urge the ring segments and rollers radially outwardly to prevent their freely dropping toward the center of the bore. The ring segments 34 and the rollers 36 are proportioned to rotate as a unit and the radially outer portion of the ends of the ring segments 34 are relieved as at 39 to permit such rotation relative to said body extension between predetermined limits without interference between the ring segments and the cam blocks 30.

The cam blocks 30 are provided with inwardly presenting cam surfaces 40 which engage the rollers 36 in all positions of the ring segments 34 relative to the annular body extension 26. The cam surfaces 40 are inclined so that during rotation of the segments 34 in one direction relative to the body extension, the rollers are moved radially inwardly, and during such rotation in the opposite direction the rollers move radially outwardly under the influence of the springs 38. Also, the inclination of the cam surfaces 40 is such that the torque transmitted to the tool by the chuck, when the tool is in operation, tends to rotate the rollers in a direction to cam the rollers 36 inwardly and tighten the grip on the tool.

In the broader aspects of the invention, it will be appreciated that the above described rotation of the ring segments 34 and the rollers 36 relative to the body extension 26, and the cam blocks 30 carried thereby, may be effected by any suitable means, but in the preferred embodiment illustrated, this movement is effected by means of an operating ring 42 which surrounds the wear ring 32 and is connected to one of the ring segments 34 by a radially inwardly directed pin 44, the outer portion of which has a threaded engagement with a ring 42 to fix the pin relative thereto, and the inner portion of which extends through aligned circumferentially elongated slots 46 and 48 formed in the wear ring 32 and the body extension 26, respectively. The inner end of the pin 44 is closely received in a cooperating aperture 50 in one of the ring segments 34, thereby connecting the ring segment to the operating ring 42 for rotation therewith.

In the preferred embodiment illustrated, the outer periphery of the operating ring 42 is knurled, as illustrated in Fig. 1, to facilitate operation thereof. Also, the operating ring is provided with a plurality of radially extending openings 51 for receiving a cooperating tool, such as a spanner wrench, which may be employed to rotate the operating ring when the same cannot be satisfactorily accomplished by grasping the knurled outer portion thereof.

The ring segments 34, the rollers 36 and the operating ring 42 are held against removal axially of the body by a retaining ring 52 which is secured to the chuck body by means of screws 54 extending axially into the outer end of the body extension 26.

From a consideration of the above described structure, it will be appreciated that the chuck operates in the following manner. To condition the chuck for the reception of a drill 56 or the like, the operating ring 42 is rotated in a counterclockwise direction, as viewed in Fig. 3. This rotation causes the ring segments 34 and the rollers 36 to likewise move in a counterclockwise direction and permit the snap rings 38 to urge the rollers 36 to the low points of the cam members 30. With the rollers 36 in this retracted position, the shank of a drill, reamer or the like may be inserted into the bore of the chuck between the rollers 36 and the operating ring 42 rotated in the opposite direction or clockwise direction as viewed in Fig. 3, to urge the rollers against the shank and firmly grip the same.

It will be appreciated that the chuck may be adapted to receive workpieces or tool shanks of different sizes by removing the retaining ring 52 and replacing the rollers 36, ring segments 34, and retaining rings 38 with larger or smaller corresponding elements of the desired size.

While only one specific embodiment of the invention has been illustrated and described in detail, it will be readily appreciated that numerous modifications and changes may be made therein without departing from the spirit of the invention or the scope of the appended claims.

What is claimed is:

1. A speed chuck comprising a body having a central bore and a plurality of arcuately spaced slots extending radially entirely through said body and communicating with said bore, cam elements mounted in said slots, a separate member surrounding said body to prevent outward movement of said elements, and means adapted to receive a part to be chucked and movable along said elements to effect a chucking of said part.

2. A speed chuck comprising a cylindrical body having a central bore and a plurality of angularly spaced slots extending radially entirely through said body and communicating with said bore, cam elements mounted in said slots, a separate ring member surrounding said body to prevent outward movement of said elements, means adapted to receive a part to be chucked and movable along said cam elements to effect a chucking of said part, and resilient means urging said first named means radially outwardly.

3. A speed chuck comprising a cylindrical body having a central bore and a circumferentially elongated slot extending radially through said body, cam means carried by said body, a plurality of equally angularly spaced cam engaging elements adapted to receive a part to be chucked and disposed in said bore for movement along said cam means to effect a chucking of said part, a plurality of similar spacers disposed in said bore intermediate said elements, an operating ring surrounding said body, and a pin connected to said ring and projecting through said slot and operatively connected to one of said spacers whereby rotation of said ring relative to said body effects rotation of said spacers and hence said cam engaging elements relative to said body.

ENOS P. SAUNDERS.

REFERENCES CITED

The following references are of record in the file of this patent:

UNITED STATES PATENTS

| Number | Name | Date |
|---|---|---|
| 420,016 | McDool | Jan. 21, 1890 |
| 1,432,225 | Wolnick et al. | Oct. 17, 1922 |
| 1,446,538 | Baines et al. | Feb. 27, 1923 |

FOREIGN PATENTS

| Number | Country | Date |
|---|---|---|
| 395,322 | Germany | of 1924 |
| 559,215 | Great Britain | of 1944 |